US008631212B2

United States Patent
Kegel et al.

(10) Patent No.: US 8,631,212 B2
(45) Date of Patent: Jan. 14, 2014

(54) INPUT/OUTPUT MEMORY MANAGEMENT UNIT WITH PROTECTION MODE FOR PREVENTING MEMORY ACCESS BY I/O DEVICES

(75) Inventors: Andrew G. Kegel, Redmond, WA (US); Ronald Perez, Austin, TX (US); Wei Huang, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 289 days.

(21) Appl. No.: 13/244,571

(22) Filed: Sep. 25, 2011

(65) Prior Publication Data
US 2013/0080726 A1 Mar. 28, 2013

(51) Int. Cl.
*G06F 13/00* (2006.01)

(52) U.S. Cl.
USPC .................... 711/152; 711/153; 711/E12.091

(58) Field of Classification Search
None
See application file for complete search history.

(56) References Cited

U.S. PATENT DOCUMENTS

| | | | |
|---|---|---|---|
| 3,970,999 A | 7/1976 | Elward | |
| 4,550,368 A | 10/1985 | Bechtolsheim | |
| 4,802,085 A | 1/1989 | Levy et al. | |
| 4,812,967 A | 3/1989 | Hirosawa et al. | |
| 5,301,287 A | 4/1994 | Herrell et al. | |
| 5,317,710 A | 5/1994 | Ara et al. | |
| 5,826,084 A | 10/1998 | Brooks et al. | |
| 5,949,436 A | 9/1999 | Horan et al. | |
| 5,956,516 A | 9/1999 | Pawlowski | |
| 5,987,557 A | 11/1999 | Ebrahim | |
| 6,065,088 A | 5/2000 | Bronson et al. | |
| 6,119,204 A | 9/2000 | Chang et al. | |
| 6,128,684 A | 10/2000 | Okayama | |
| 6,553,460 B1* | 4/2003 | Chopra et al. | 711/125 |
| 6,591,340 B2* | 7/2003 | Chopra et al. | 711/118 |
| 6,598,128 B1* | 7/2003 | Yoshioka et al. | 711/144 |
| 6,622,193 B1 | 9/2003 | Avery | |
| 6,629,207 B1* | 9/2003 | Yoshioka et al. | 711/125 |
| 6,725,289 B1 | 4/2004 | Waldspurger et al. | |

(Continued)

FOREIGN PATENT DOCUMENTS

| | | |
|---|---|---|
| EP | 1139222 | 10/2001 |
| WO | 03/090074 | 10/2003 |

OTHER PUBLICATIONS

Darren Abramson, et al., "Intel Virtualization Technology for Directed I/O," Aug. 10, 2006, Intel Technology Journal, vol. 10, Issue 3, 2006, 16 pages.

(Continued)

*Primary Examiner* — Edward Dudek, Jr.
*Assistant Examiner* — Sean D Rossiter
(74) *Attorney, Agent, or Firm* — Rory D. Rankin; Meyertons, Hood, Kivlin, Kowert & Goetzel, P.C.

(57) ABSTRACT

A memory management unit is configured to receive requests for memory access from a plurality of I/O devices. The memory management unit implements a protection mode wherein the unit prevents memory accesses by the plurality of I/O devices by mapping memory access requests (from the I/O devices) to the same set of memory address translation data. When the memory management unit is not in the protected mode, the unit maps memory access requests from the plurality of I/O devices to different respective sets of memory address translation data. Thus, the memory management unit may protect memory from access by I/O devices using fewer address translation tables than are typically required (e.g., none).

33 Claims, 5 Drawing Sheets

(56) References Cited

U.S. PATENT DOCUMENTS

| | | |
|---|---|---|
| 6,886,171 B2 | 4/2005 | MacLeod |
| 6,888,843 B2 | 5/2005 | Keller et al. |
| 6,901,474 B2 | 5/2005 | Lym et al. |
| 6,928,529 B2 | 8/2005 | Shinomiya |
| 6,938,094 B1 | 8/2005 | Keller et al. |
| 7,073,043 B2 | 7/2006 | Arimilli et al. |
| 7,155,379 B2 | 12/2006 | Oshins et al. |
| 7,190,694 B2 | 3/2007 | Sato et al. |
| 7,209,994 B1 | 4/2007 | Klaiber et al. |
| 7,302,511 B2 | 11/2007 | Jeyasingh et al. |
| 7,480,784 B2 | 1/2009 | Hummel et al. |
| 7,487,327 B1 | 2/2009 | Chang et al. |
| 7,516,247 B2 | 4/2009 | Hummel et al. |
| 7,543,131 B2 | 6/2009 | Hummel et al. |
| 7,548,999 B2 | 6/2009 | Haertel et al. |
| 7,552,436 B2 | 6/2009 | Brice, Jr. et al. |
| 7,849,287 B2 | 12/2010 | Hummel et al. |
| 7,873,770 B2 | 1/2011 | Hummel et al. |
| 2002/0083254 A1 | 6/2002 | Hummel et al. |
| 2003/0135685 A1 | 7/2003 | Cowan |
| 2003/0200405 A1 | 10/2003 | Willman et al. |
| 2004/0215860 A1 | 10/2004 | Armstrong et al. |
| 2006/0069899 A1 | 3/2006 | Schoinas et al. |
| 2006/0075146 A1 | 4/2006 | Schoinas et al. |
| 2006/0112241 A1* | 5/2006 | Weiss et al. ................... 711/154 |
| 2006/0195848 A1 | 8/2006 | Arndt et al. |
| 2006/0200616 A1 | 9/2006 | Maliszewski |
| 2006/0206687 A1 | 9/2006 | Vega |
| 2006/0230208 A1 | 10/2006 | Gregg et al. |
| 2006/0277348 A1 | 12/2006 | Wooten |
| 2006/0288130 A1 | 12/2006 | Madukkarumukumana et al. |
| 2006/0294277 A1 | 12/2006 | Tetrick |
| 2007/0067505 A1 | 3/2007 | Kaniyur et al. |
| 2007/0079039 A1 | 4/2007 | Raj |
| 2007/0168643 A1 | 7/2007 | Hummel et al. |
| 2008/0114906 A1 | 5/2008 | Hummel et al. |
| 2008/0114916 A1 | 5/2008 | Hummel et al. |
| 2008/0120487 A1 | 5/2008 | Saripalli |
| 2008/0209130 A1 | 8/2008 | Kegel et al. |
| 2009/0187697 A1 | 7/2009 | Serebrin |
| 2010/0031360 A1* | 2/2010 | Seshadri et al. ................. 726/24 |
| 2011/0023027 A1 | 1/2011 | Kegel et al. |

OTHER PUBLICATIONS

Mark Hummel, "IO Memory Management Hardware goes Mainstream," WinHEC, Apr. 25-27, 2006, 7 pages.

PowerPC 601 RISC Microprocessor User's Manual, Chapter 6 "Memory Management Unit," Motorola, 1993, 65 pages.

AMD 64-Bit Technology: AMD x86-64 Architecture Programmer's Manual; vol. 2: System programming, Chapter 5, "Page Translation and Protection," Sep. 2002, pp. 143-176.

International Search Report in Application No. PCT/US2010/043169 mailed Nov. 5, 2010, 12 pages.

International Search Report in Application No. PCT/US2009/002639 mailed Aug. 27, 2009, 3 pages.

International Search Report and Written Opinion in Application No. PCT/US2012/056898 mailed Jan. 7, 2013, 10 pages.

* cited by examiner

INPUT/OUTPUT MEMORY MANAGEMENT UNIT WITH PROTECTION MODE FOR PREVENTING MEMORY ACCESS BY I/O DEVICES

BACKGROUND

Security is an important consideration in the design of many computer systems. For example, a user who wants to access an electronic document on a desktop computer may want to ensure that opening the document does not allow some malicious actor to read and/or alter the document contents. However, if the computing environment contains malicious software, such as a virus, spyware, or even bugs, the document contents may be leaked and/or altered.

To protect against malicious actors, a user may want to insure that the computing environment contains only known, trusted software. For example, the user opening the document on a desktop computer may want to ensure that the computing environment is executing only known, trusted code, and that no malicious software may leak and/or alter the document contents. In another example, a user of a voting machine may want to ensure that the machine is executing only the trusted voting-machine software and that the software has not been corrupted to alter the user's vote or to allow an unauthorized party to view the vote.

Some systems provide hardware support for a trusted initialization procedure that ensures only trusted software is loaded. For example, a central processing unit (CPU) instruction set may include a secure kernel initialization instruction, such as SKINIT, which may be used to implement a trusted bootstrap. To implement the trusted bootstrap, a secure kernel initialization instruction may protect a small portion of memory and then load trusted software into that protected portion. The trusted software, referred to herein as the trusted boot (TBOOT) sequence, may then set up software constructs to load additional trusted software in a safe manner. For example, the SKINIT instruction is a secure kernel initialization instruction that protects a 64K region of memory by disabling interrupts, disabling direct memory access (DMA) from peripheral devices to the protected memory region, and disabling all cores but the one executing the SKINIT instruction. Once the 64K region is protected, the SKINIT may load the TBOOT sequence into the protected region. In some cases, the SKINIT instruction may instruct a system component (e.g., a trusted processing module) to store a checksum of the TBOOT sequence, which may later be used to verify whether the TBOOT sequence was safely loaded rather than altered or otherwise compromised.

SUMMARY OF EMBODIMENTS

A memory management unit is configured to receive requests for memory access from a plurality of input/output (I/O) devices. The memory management unit implements a protection mode wherein the unit prevents memory accesses by the plurality of I/O devices by mapping memory access requests (from the I/O devices) to the same set of memory address translation data. When the memory management unit is not in the protected mode, the unit maps memory access requests from the plurality of I/O devices to different respective sets of memory address translation data. Thus, the memory management unit may protect memory from access by I/O devices using fewer address translation tables than are typically required. In various embodiments, the memory address translation data may be stored in memory using one or more memory address translation tables and/or in one or more hardware registers.

In some embodiments, software may use the memory management unit to implement a trusted initialization procedure. The secure initialization procedure may include executing a secure kernel initialization instruction to protect a portion of system memory from direct memory access by the plurality of I/O devices. The procedure may then create a set of one or more address translation tables within the protected portion of memory, wherein the translation tables prevent memory access. The software may then configure the memory management unit to execute in the protection mode, such that the memory management unit prevents memory access by the I/O devices by mapping memory access requests from the I/O devices to the set of one or more address translation tables that prevent memory access. When not executing in the protection mode, the memory management unit is configured to map I/O requests from the plurality of I/O devices to different respective sets of one or more memory address translation tables.

DETAILED DESCRIPTION

Figure 1:
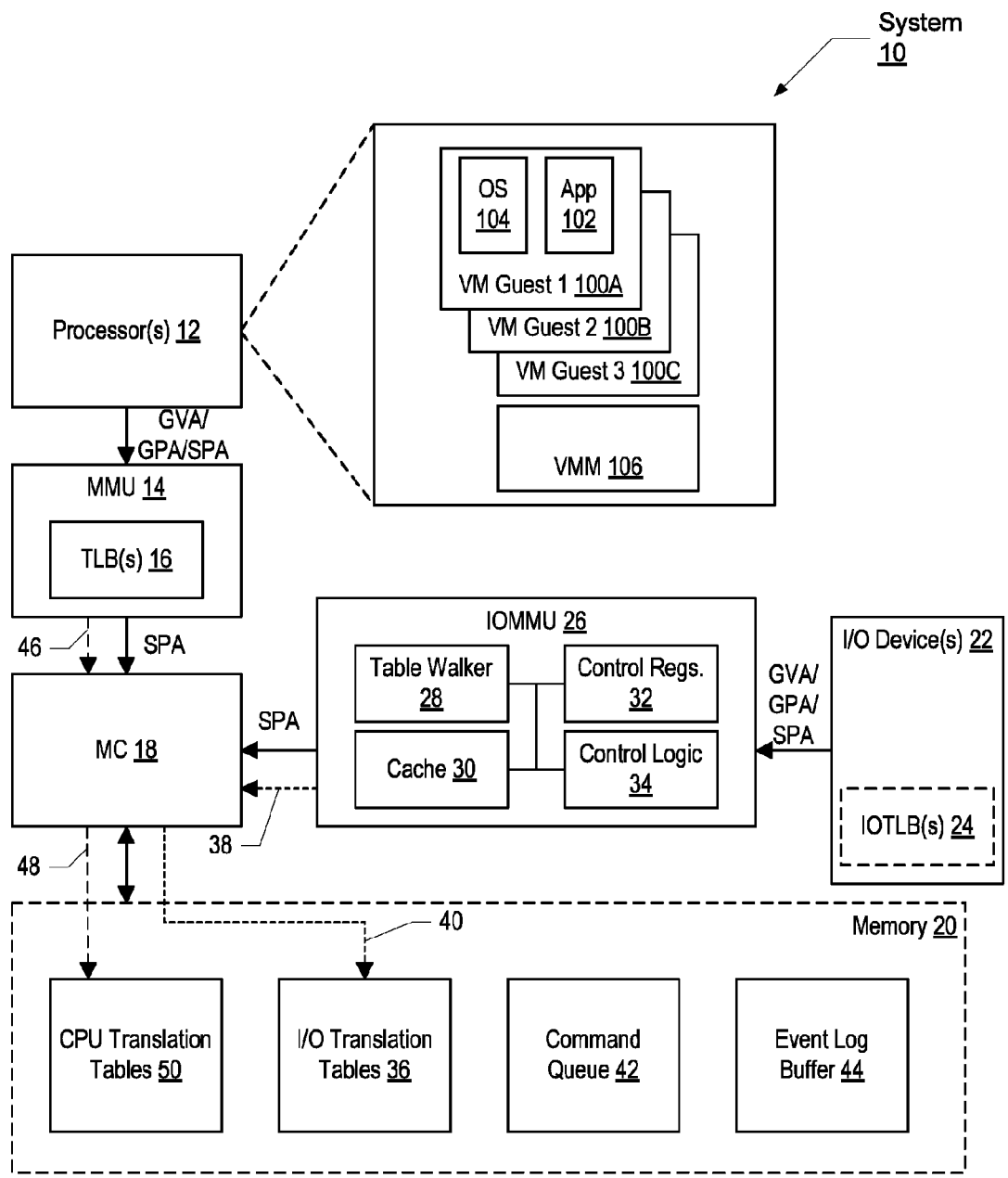
FIG. 1 is a block diagram illustrating a high-level view of a computer system that includes an input/output memory management unit (IOMMU) configured to perform memory access parameter injection, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Some computer systems provide hardware support for a trusted boot operation. For example, the SKINIT instruction protects a 64K region of memory from access by various processors and peripheral devices, loads a trusted program sequence (TBOOT) into the protected region, and permits the TBOOT to load other trusted software in a safe manner.

As modern software and hardware systems have grown in size and complexity, the 64K region of memory protected by the SKINIT instruction has become too small for storing an effective TBOOT sequence. For example, some modern systems enable peripheral devices to perform memory access (e.g., DMA) through an I/O memory management unit (IOMMU), which is configured to enforce memory restraints by translating virtual memory addresses specified in memory access requests to system physical addresses. An example of such an IOMMU is disclosed in U.S. Patent Publication 2011/0023027, I/O Memory Management Unit Including Multi-level Address Translation for I/O and Computation Offload, which is incorporated by reference herein in its entirety. In such a system, a TBOOT sequence could theoretically configure the IOMMU to block memory access operations by creating I/O translation tables for the IOMMU, where the tables enforce the desired memory restraints. However, the I/O translation tables may require significant memory and, therefore, it may be difficult or impossible to fit these data structures within the 64K region protected by the SKINIT instruction. For example, an IOMMU that identifies peripheral devices using a 16-bit bus/device/function identifier (BDF) may require respective translation tables for up to 65536 peripheral devices. Because each device requires more than one byte of memory, a TBOOT sequence with only 64K of memory may not have sufficient resources to configure the IOMMU to restrict memory access operations from all peripherals.

According to some embodiments, an IOMMU may be configurable by software to operate in a protection mode, whereby the IOMMU disables memory access by peripheral devices without requiring a significant storage footprint. In some embodiments, the IOMMU may include a protection flag that may be set to instruct the IOMMU to treat every incoming memory access request as though the request came from the same device. For example, if the IOMMU identifies devices using respective BDF identifiers, an IOMMU whose protection flag is set may treat every incoming DMA request as though it came from BDF 0, regardless of which device sent the request. The IOMMU device table entry corresponding to the default BDF value (e.g., 0) may be programmed using any of the capabilities of the IOMMU and need not be limited to any functional subset. The IOMMU may translate all memory access requests using a single set of tables, which correspond to BDF 0. Thus, all relevant I/O translation tables may be stored on a single page and in some embodiments, any memory after the first eight to sixteen bytes of the page may be used for non-IOMMU purposes.

In some embodiments, the set of tables that prevent memory accesses (e.g., those corresponding to BDF 0 above) may be implemented as tables stored in memory. However, in various embodiments some or all of such tables (or the information contained therein) may be stored using other storage mechanisms. For example, in some embodiments, the IOMMU may store the translation data in one or more registers, which may appear in memory-mapped input/output (MMIO) space. Thus, the memory footprint of the translation information may be reduced to zero. Although many of the embodiments described below utilize memory to store translation data that prevents the memory access, it should be understood that in various embodiments, some or all of the translation data may be stored using other mechanisms, such as IOMMU registers. The term translation data is used generally herein to refer to any data used to determine a memory address translation, regardless of where in the system that data is stored.

By reducing the size of translation tables needed by an IOMMU when operating in the protection mode, the mechanisms described above enables a TBOOT sequence to use a small IOMMU data structure (e.g., page table) to protect all of memory from access by peripheral devices. Under the protection of the IOMMU in the protection mode, the TBOOT sequence may set up more complex IOMMU data structures and/or page tables that are larger than the protection limits of SKINIT. Once such structures and tables are created, software can return the IOMMU to normal operation by unsetting the protection flag.

FIG. 1 is a block diagram illustrating a high-level view of a computer system that includes an IOMMU configured to perform memory access parameter injection, according to some embodiments. In the illustrated embodiment, system 10 includes one or more processors 12, a memory management unit (MMU 14), a memory controller (MC 18), memory 20, one or more peripheral I/O devices 22, and IOMMU 26. MMU 14 comprises one or more translation lookaside buffers (TLBs) 16 and peripheral I/O devices 22 comprise one or more I/O TLBs (IOTLBs) 24. According to the illustrated embodiment, I/O MMU (IOMMU) 26 comprises a table walker 28, a cache 30, control registers 32, and control logic 34. Processors 12 are coupled to the MMU 14, which is coupled to the memory controller 18. The I/O devices 22 are coupled to the IOMMU 26, which is coupled to the memory controller 18. Within the IOMMU 26, the table walker 28, the cache 30, the control registers 32, and the control unit 34 are coupled together.

System 10 illustrates high-level functionality of the system, and the actual physical implementation may take many forms. For example, the MMU 14 may be integrated into each processor 12. Though a memory 20 is shown, the memory system may be a distributed memory system, in some embodiments, in which the memory address space is mapped to multiple, physically separate memories coupled to physically separate memory controllers. The IOMMU 26 may be placed anywhere along the path between I/O-sourced memory requests and the memory 20, and there may be more than one IOMMU. Still further, IOMMUs may be located at different points in different parts of the system.

The processors 12 may comprise any processor hardware, implementing any desired instruction set architecture. In one embodiment, the processors 12 implement the x86 architecture, and more particularly the AMD64™ architecture. Various embodiments may be superpipelined and/or superscalar. Embodiments including more than one processor 12 may be implemented discretely, or as chip multiprocessors (CMP) and/or chip multithreaded (CMT).

The memory controller 18 may comprise any circuitry designed to interface between the memory 20 and the rest of the system 10. The memory 20 may comprise any semiconductor memory, such as one or more RAMBUS DRAMs (RDRAMs), synchronous DRAMs (SDRAMs), DDR SDRAM, static RAM, etc. The memory 20 may be distributed in a system, and thus there may be multiple memory controllers 18.

The MMU 14 may comprise a memory management unit for memory requests sourced by a processor 12. The MMU may include translation lookaside buffers (TLBs) 16, as well as table walk functionality. When a translation is performed by the MMU 14, the MMU 14 may generate translation memory requests (e.g. shown as dotted arrows 46 and 48 in FIG. 1) to the CPU translation tables 50. The CPU translation tables 50 may store translation data as defined in the instruction set architecture implemented by the processors 12.

The I/O devices 22 may comprise any devices that communicate between the computer system 10 and other devices, provide human interface to the computer system 10, provide storage (e.g. disk drives, compact disc (CD) or digital video disc (DVD) drives, solid state storage, etc.), and/or provide enhanced functionality to the computer system 10. For example, the I/O devices 22 may comprise one or more of: network interface cards, integrated network interface functionality, modems, video accelerators, audio cards or integrated audio hardware, hard or floppy disk drives or drive controllers, hardware interfacing to user input devices such as keyboard, mouse, tablet, etc., video controllers for video displays, printer interface hardware, bridges to one or more peripheral interfaces such as peripheral component interface (PCI), PCI express (PCIe), PCI-X, USB, firewire, SCSI (Small Computer Systems Interface), etc., sound cards, and a variety of data acquisition cards such as general-purpose interface bus (GPIB) or field bus interface cards, etc. The term "peripheral device" may also be used to describe some I/O devices.

In some cases, one or more of the I/O devices 22 may comprise an input/output translation lookaside buffer (IOTLB), such as IOTLBs 24 and/or an MMU. These IOTLBs may be referred to as "remote IOTLBs", since they are external to the IOMMU 26. In such cases, the addresses that have already been translated may be marked in some fashion so that the IOMMU 26 does not attempt to translate the memory request again. In one embodiment, the translated addresses may simply be marked as "pretranslated."

As described further below, the IOMMU 26 may include various features to simplify virtualization in the system 10. The description below will refer to a virtual machine monitor (VMM) that manages the virtual machines (scheduling their execution on the underlying hardware), controls access to various system resources, and/or provides other functions. The term VMM and hypervisor are used interchangeably in this disclosure.

In the illustrated embodiment, processor(s) 12 is configured to execute software in a virtualized environment. Accordingly, FIG. 1 shows three virtual machines 100A, 100B, and 100C (i.e., VM guests 1-3) executing on VMM 106. The number of virtual machines in a given embodiment may vary at different times, and may dynamically change during use as virtual machines are started and stopped by a user. In the illustrated embodiment, the virtual machine 100A includes one or more guest applications 102 and a guest operating system (OS) 104 configured to execute, provide services to, and/or otherwise manage the execution ones of applications 102. The OS 104 is referred to as a "guest" OS, since the OS 104 controls the virtual machine created for it by the VMM 106, rather than the physical hardware of the system 10. Similarly, the VM 100B and VM 100C may also each include one or more guest applications and a guest OS.

Applications in a virtual machine use a virtual address space of the virtual machine, and therefore guest virtual addresses (GVAs). The guest OS of the virtual machine may manage settings (e.g., page tables) in IOMMU 26 to enable the IOMMU to map the virtual machine's GVAs to guest physical addresses (GPAs), which are also specific to the same virtual machine. If the guest OS were running directly on the system hardware, with no VMM interposed, the physical addresses that the OS settings generate would indeed be the system physical addresses (SPA) for system 10. However, because the guest OS is running in a virtual machine, it may only provide settings for translation from a guest-specific GVA to a GPA specific to the same guest. Therefore, in some embodiments, the virtual machine monitor (e.g., VMM 106) may manage settings in the IOMMU for mapping GPAs of various guest machines to corresponding SPAs of the underlying system. Thus, if an I/O device 22 performs a memory access request specifying a GVA of guest 100A, the IOMMU 26 may use settings from VMM 106 and guest OS 104 to translate the GVA to an SPA.

As illustrated in FIG. 1, the path from the I/O devices 22 to the memory 20 is at least partially separate from the path of the processors 12 to the memory 20. Specifically, the path from the I/O devices 22 to memory 20 does not pass through the MMU 14, but instead goes through the IOMMU 26. Accordingly, the MMU 14 may not provide memory management for the memory requests sourced from the I/O devices 22.

Generally, memory management may provide address translation and memory protection. Address translation translates a virtual address to a physical address (e.g., a GVA to SPA, as described above). Memory protection functions may control read and/or write access to the memory at some level of granularity (e.g., a page), along with various other memory access parameters, such as privilege level requirements, cacheability and cache controls (e.g., writethrough or writeback), coherency, no-execute (NX) flags, etc. Any set of memory protections may be implemented in various embodiments. In some embodiments, the memory protections implemented by the IOMMU 26 may differ from the memory protections implemented by the MMU 14, in at least some respects. In one embodiment, the memory protections implemented by the IOMMU 26 may be defined so that the translation tables storing the translation data used by the IOMMU 26 and the MMU 14 may be shared (although shown separately in FIG. 1 for ease of discussion). In other embodiments, the translation tables may be separate and not shared between the IOMMU 26 and the MMU 14, to various extents.

I/O devices 22 may be configured to issue memory access requests, such as direct memory access (DMA), address translation services (ATS) access, page request interface (PRI) access, and/or other types of operations to access memory 20. Some operation types may be further divided into subtypes. For example, DMA operations may be read, write, or interlocked operations. However, the term DMA may be used generically herein to refer to any memory access request from an I/O device. Memory access operations may be initiated by software executing on one or more of processors 12. The software may program the I/O devices 22 directly or indirectly to perform the DMA operations.

The software may provide the I/O devices 22 with addresses corresponding to an address space in which the software is executing. For example, a guest application (e.g., App 102) executing on processor 12 may provide an I/O device 22 with GVAs, while a guest OS executing on processor 12 (e.g., OS 104) may provide GPAs to the I/O devices 22.

When I/O device 22 requests a memory access, the guest addresses (GVAs or GPAs) may be translated by the IOMMU 26 to corresponding system physical addresses (SPAs). The IOMMU may present the SPAS to the memory controller 18 for access to memory 20. That is, the IOMMU 26 may modify the memory requests sourced by the I/O devices 22 to change (i.e., translate) the received address in the request to an SPA, and then forward the SPA to the memory controller 18 to access memory 20.

In various embodiments, the IOMMU 26 may provide one-level, two-level, or no translations depending on the type of address it receives from the I/O device. For example, in response to receiving a GPA, the IOMMU 26 may provide a GPA-to-SPA (one-level) translation, and in response to receiving a GVA, the IOMMU 26 may provide a GVA-to-SPA (two-level) translation. Therefore, a guest application may provide GVA addresses directly to an I/O device when requesting memory accesses, thereby making conventional VMM interception and translation unnecessary. Although one-level, two-level, or no translations are described, it is contemplated that in other embodiments, additional address spaces may be used. In such embodiments, additional levels of translation (i.e., multilevel translations) may be performed by IOMMU 26 to accommodate additional address spaces.

The IOMMU 26 illustrated in FIG. 1 may include the table walker 28 to search the I/O translation tables 36 for a translation for a given memory request. The table walker 28 may generate memory requests to read the translation data from the translation tables 36. The translation table reads are illustrated by dotted arrows 38 and 40 in FIG. 1.

To facilitate more rapid translations, the IOMMU 26 may cache some translation data. For example, the cache 30 may be a form of cache similar to a TLB, which caches the result of previous translations, mapping guest virtual and guest physical page numbers to system physical page numbers and corresponding translation data. If a translation is not found in the cache 30 for the given memory request, the table walker 28 may be invoked. In various embodiments, the table walker 28 may be implemented in hardware, or in a microcontroller or other processor and corresponding executable code (e.g. in a read-only memory (ROM) in the IOMMU 26). Other caches may be included to cache page tables, or portions thereof, and/or device tables, or portions thereof, as part of cache 30. Accordingly, the IOMMU 26 may include one or more memories to store translation data that is read from, or derived from, translation data stored in the memory 20.

The control logic 34 may be configured to access the cache 30 to detect a hit/miss of the translation for a given memory request, and may invoke the table walker 28. The control logic 34 may also be configured to modify the memory request from the I/O device with the translated address, and to forward the request upstream toward the memory controller 18.

The control logic 34 may control various other functionalities in the IOMMU 26 as programmed into the control registers 32. For example, the control registers 32 may define an area of memory to be a command queue 42 for memory management software to communicate control commands to the IOMMU 26. The control logic 34 may be configured to read the control commands from the command queue 42 and execute the control commands. In some embodiments, the control registers 32 may define another area of memory to be an event log buffer 44. The control logic 34 may detect various events and write them to the event log buffer 44. The events may include various errors detected by the control logic 34 with respect to translations and/or other functions of the IOMMU 26. The control logic 34 may also implement other features of the IOMMU 26.

In some embodiments, control registers 32 may include one or more protection flags and/or fields, which may be used by software to put the IOMMU into a protection mode. Many of the embodiments described herein use a protection flag (e.g., one bit) that may be set by software to put the IOMMU into the protection mode and unset to return the IOMMU to normal operation. However, in various other embodiments, similar functionality may be implemented by a combination of flags and/or fields.

Figure 2:
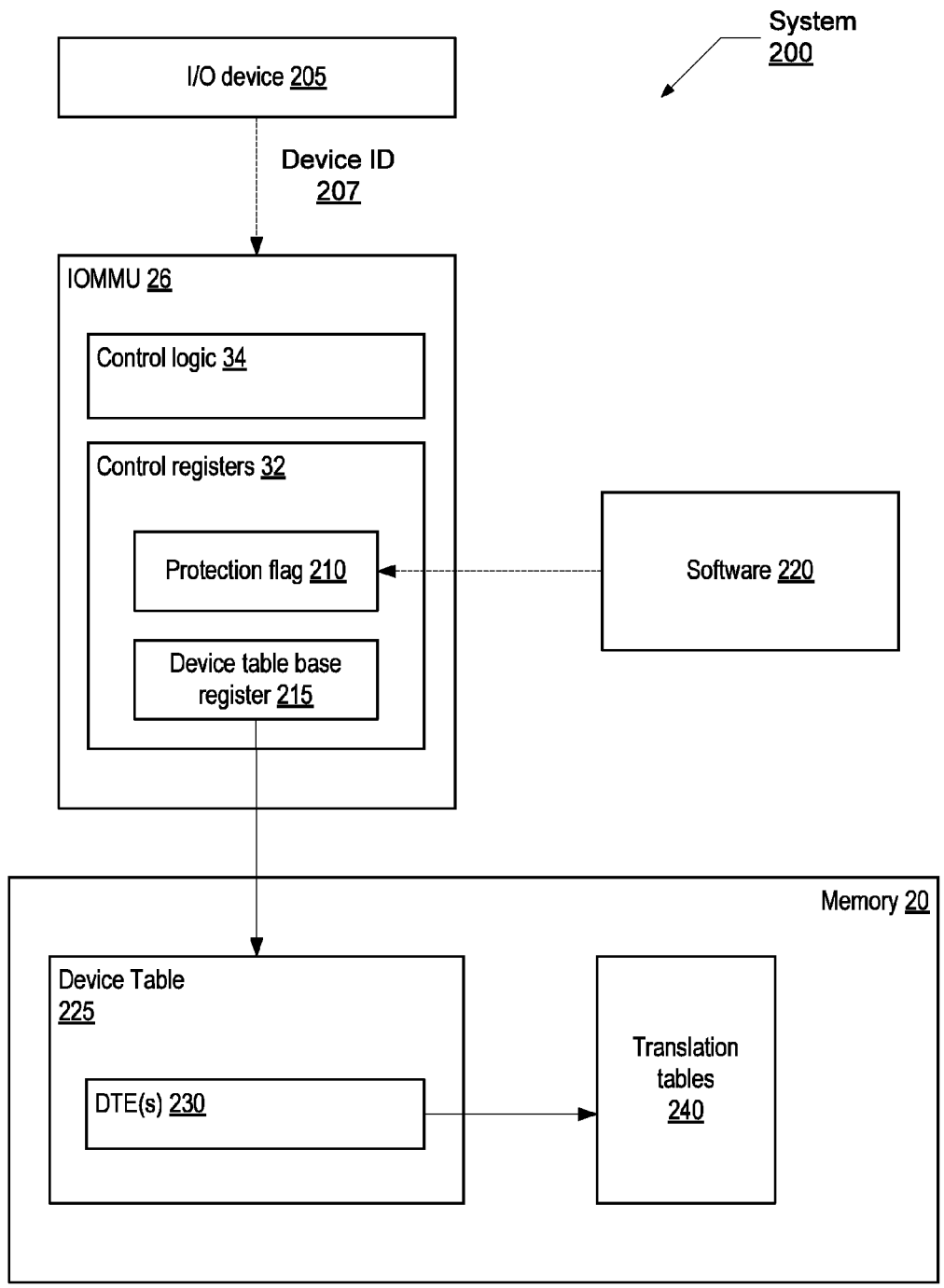
FIG. 2 is a block diagram of a system configured to implement IOMMU-provided memory protection, as described here.

FIG. 2 is a block diagram of a system configured to implement IOMMU-provided memory protection, as described here. In some embodiments, system 200 may correspond to I/O Device(s) 22, IOMMU 26, and Memory 20 of FIG. 1. To facilitate analogy, some components of system 200 are labeled using numbers that correspond to analogous components of system 20. However, the functionality provided by such components may vary across the two systems depending on particular implementation details.

According to the illustrated embodiment, system 200 includes an I/O device 205, which may correspond to one of I/O devices 22 of FIG. 1. I/O device 205 may be configured to make memory access requests (e.g., DMA) to IOMMU 26. As described above, memory access requests from peripheral devices may include a device identifier, such as a BDF number, which indicates the particular device from which a particular memory access request originated. For example, memory access requests from device 205 are tagged with device ID 207.

IOMMU 26 includes control logic 34, which may be configured to actuate memory access requests, perform memory address translation, implement memory protection, and/or implement various other functionality of IOMMU 26. The functionality of control logic 32 may be dependent on values stored in various ones of control registers 32.

To perform memory translation, IOMMU 26 may require access to various translation tables stored in memory 20. One such table may be device table 225, which may contain a respective entry for each I/O device that can make a memory access request. IOMMU 26 may be configured to locate the device table using a memory address stored in device table base register 215, which may store a memory address of memory 20 where the device table is stored. Thus, when translating a memory address, the IOMMU may locate the device table by reading the table's memory address from base register 215.

In some embodiments, a device table (such as 225) may include a respective device table entry (DTE) for each I/O device that is capable of making a memory access request. In the illustrated embodiment, device table 225 includes device table entries (DTEs) 230. In typical operation (e.g., non-protection mode), each DTE corresponds to a respective peripheral device. For example, each DTE may correspond to a respective device identifier (such as device ID 207) corresponding to the device. The DTE may contain pointers and/or other data structures usable to translate memory addresses of memory access requests from that device.

Device table 225 may be indexed by device identifiers, such as BDF numbers. Thus, IOMMU control logic may use a device identifier received as part of a given memory access request, to locate a DTE corresponding to the requesting device. For example, in the illustrated embodiment, I/O device 205 may include device ID 207 when communicating with the IOMMU. In response to receiving a message from I/O device 205, the IOMMU may use device ID 207 to locate a corresponding DTE of per-device DTEs 235 in device table 225.

In different embodiments, the device identifier may be defined in different ways, and may be based on the peripheral interconnect to which the device is attached. For example, Peripheral Component Interconnect (PCI) devices may form a device ID from the bus number, device number and function number (BDF) while HyperTransport™ (HT) devices may use a bus number and unit ID to form a device ID.

Each DTE may include one or more pointers to a set of translation tables (e.g., tables 240) that the IOMMU can use to translate memory addresses from the corresponding device. The particular number and/or type of pointers and translation tables 240 may vary across embodiments, and may include various translation and/or page tables implementing multi-level translation. For example, a pointer may point to a page table that is the starting point for translation searching in the translation tables 240. The starting page table may include pointers to other page tables, in a hierarchical fashion. Some tables may be indexed by a process identifier, such as a process address space identifier (PASID), while other tables may be indexed using various bits of the address that is to be translated (e.g., GVA or GPA). Thus, the translation tables 240 may support various one or two-level translations.

In some embodiments, DTEs 230 may include a restricted DTE, which may be configured to disallow memory access operations from any device that maps to the restricted DTE. For example, in some embodiments, a restricted DTE may include various control flags that explicitly prohibit memory access by a corresponding device. In other embodiments, the restricted DTE, or a memory table of 240 pointed to by the restricted DTE, may indicate that a device corresponding the DTE may only access a small, or even zero-sized, portion of memory that does not threaten the trusted boot sequence. Various other mechanisms for prohibiting memory access of a device that maps to the restricted DTE are possible.

In some embodiments, software (such as 220) may configure the IOMMU to execute in a protection mode, wherein the IOMMU maps all memory access requests to restricted DTE 230. In various embodiments, software 220 may correspond to an operating system, a virtual operating system, virtual machine monitor, a TBOOT sequence, and/or other software.

In FIG. 2, software 220 configures IOMMU 26 to execute in a protection mode by setting protection flag 210 in control registers 32.

While executing in protection mode, IOMMU 26 may map every memory access request to the restricted DTE, thereby effectively prohibiting memory access by peripheral devices. Because every memory access request maps to the same DTE (i.e., the restricted DTE), while the IOMMU executes in protection mode, device table 225 need only contain the restricted DTE. Therefore, the memory footprint required to store the device table data structure during a trusted boot initialization is small. For example, in some embodiments, a TBOOT sequence may create device table 225 that contains only one entry: a restricted DTE. Since such a table need not include other per-device DTE in 230, the table is relatively small and can fit within the protected 64K memory region created by an SKINIT instruction. Once the restricted DTE is created, the TBOOT sequence may set protection flag 210 to disable all peripheral memory access.

Figure 3:
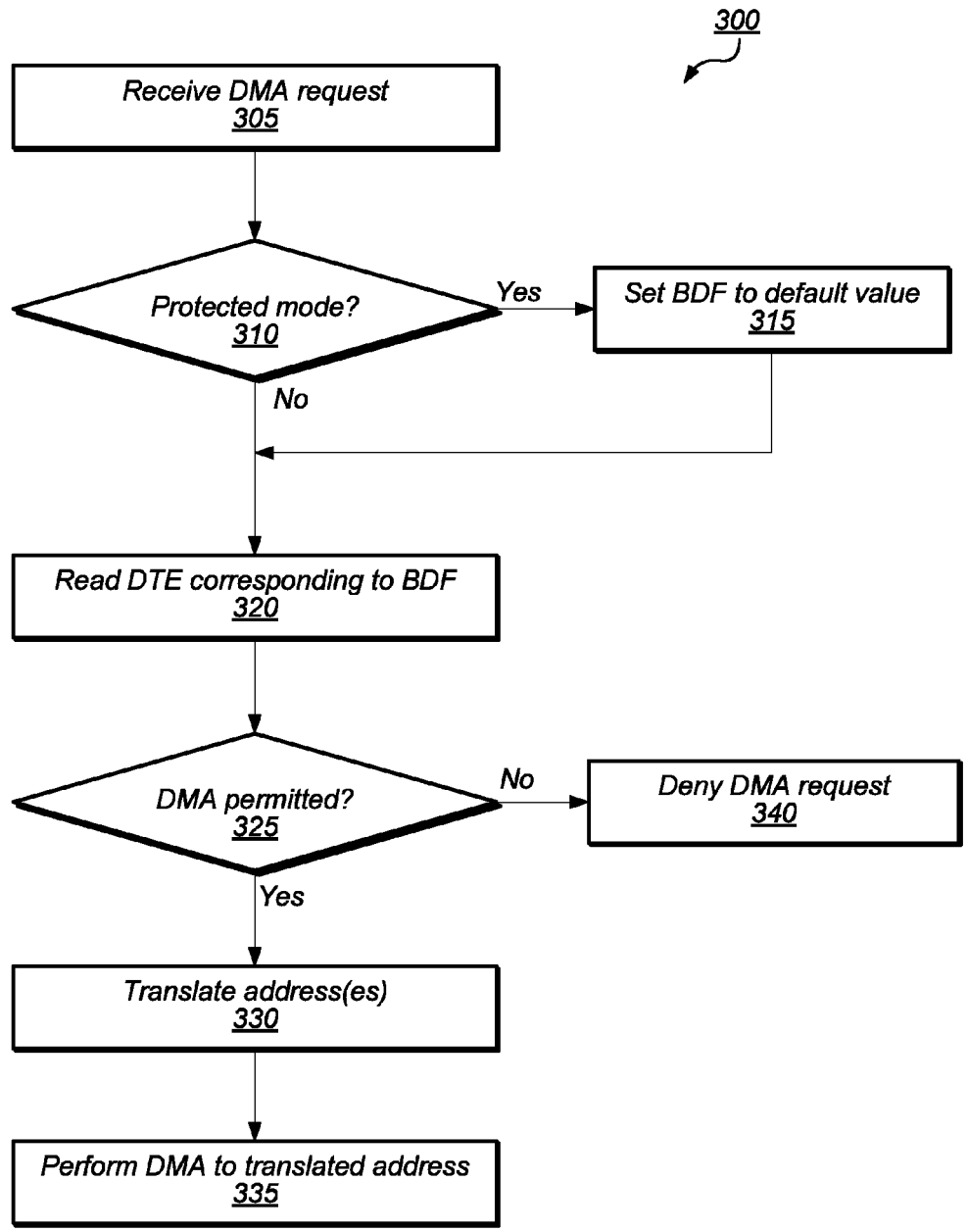
FIG. 3 is a flow diagram illustrating a method of operating an IOMMU configured to implement a protection mode, according to some embodiments.

FIG. 3 is a flow diagram illustrating a method of operating an IOMMU configured to implement a protection mode, according to some embodiments. The method of FIG. 3 may be executed by an IOMMU, such as IOMMU 26 of FIG. 1.

Method 300 starts when the IOMMU receives a memory access request from an I/O device, as in 305. In various situations, the request may correspond to a DMA request to read and/or write memory data. The request may include at least one memory address (e.g., an address from which to read or write data), which may be specified in a virtual address space. The request may also include a device identifier, such as a BDF number.

In 310, the IOMMU may determine whether it is executing in a protection mode. In some embodiments, the IOMMU may examine one or more protection flags, such as protection flag 210 (shown in FIG. 2), to make the determination of 310. For example, if protection flag 210 is set, the IOMMU may determine in decision 310 that the IOMMU is in a protection mode.

If the IOMMU determines that it is in a protection mode, as indicated by the affirmative exit from 310, it may set the device identifier of the request to a default value. For example, in 315, the IOMMU sets the BDF value to a default value, such as 0. In other embodiments, different default values may be used and/or identifiers other than a BDF value may be used to identify a device.

In 320, the IOMMU may read the DTE corresponding to the BDF number associated with the request. If the IOMMU is not executing in protection mode, as indicated by the negative exit from 310, the BDF number may correspond to the I/O device making the DMA request. In such a case, the IOMMU may identify and read (in 320) the DTE correspond to the I/O device. However, if the IOMMU is executing in the protection mode (as indicated by the affirmative exit from 310), the BDF number was set to the default value (e.g., 0) in 315. Therefore, in such a case, the IOMMU would identify and read (in 320) the restricted DTE.

In 325, the IOMMU may use the DTE from 320 to decide whether the DMA request of 305 is permitted. As described above, the restricted DTE may be configured to disallow memory access operations from any device that maps to the restricted DTE. In different embodiments, a restricted DTE may include a control flag that explicitly prohibits memory access, a pointer to translation table that indicates the device may only access a small or zero-sized portion of memory, and/or another mechanism for prohibiting DMA access from interfering with the trusted boot process.

If the IOMMU determines that the DMA operation is permitted, as indicated by the affirmative exit from 325, the IOMMU translates one or more addresses of the DMA, as in 330, and performs the DMA operation, as in 335. As described above, translating the addresses found in the DMA request may comprise analyzing one or more translation tables, such as I/O translation tables 36 and/or tables 240.

As described above, in some embodiments, the IOMMU may use hardware registers to store translation data that implements the protection mode, rather than storing that translation data in one or more memory-based translation tables. To implement the protection mode, such an IOMMU may respond to determining it is in the protection mode (as indicated by the affirmative exit from 310), by reading the translation data from the hardware registers rather than from memory (as in 315 and/or 320). After reading the translation data from registers, the method may resume at 325.

If the IOMMU determines that the DMA operation is not permitted, as indicated by the negative exit from 325, the IOMMU may deny the memory access operation, as in 340. In various embodiments, denying the operation may be performed in different ways. For example, in some embodiments, denying the memory access request may comprise returning an error code to the requesting device. In various embodiments, the IOMMU may perform other actions, such as returning various codes or no code at all to the peripheral device.

Figure 4:
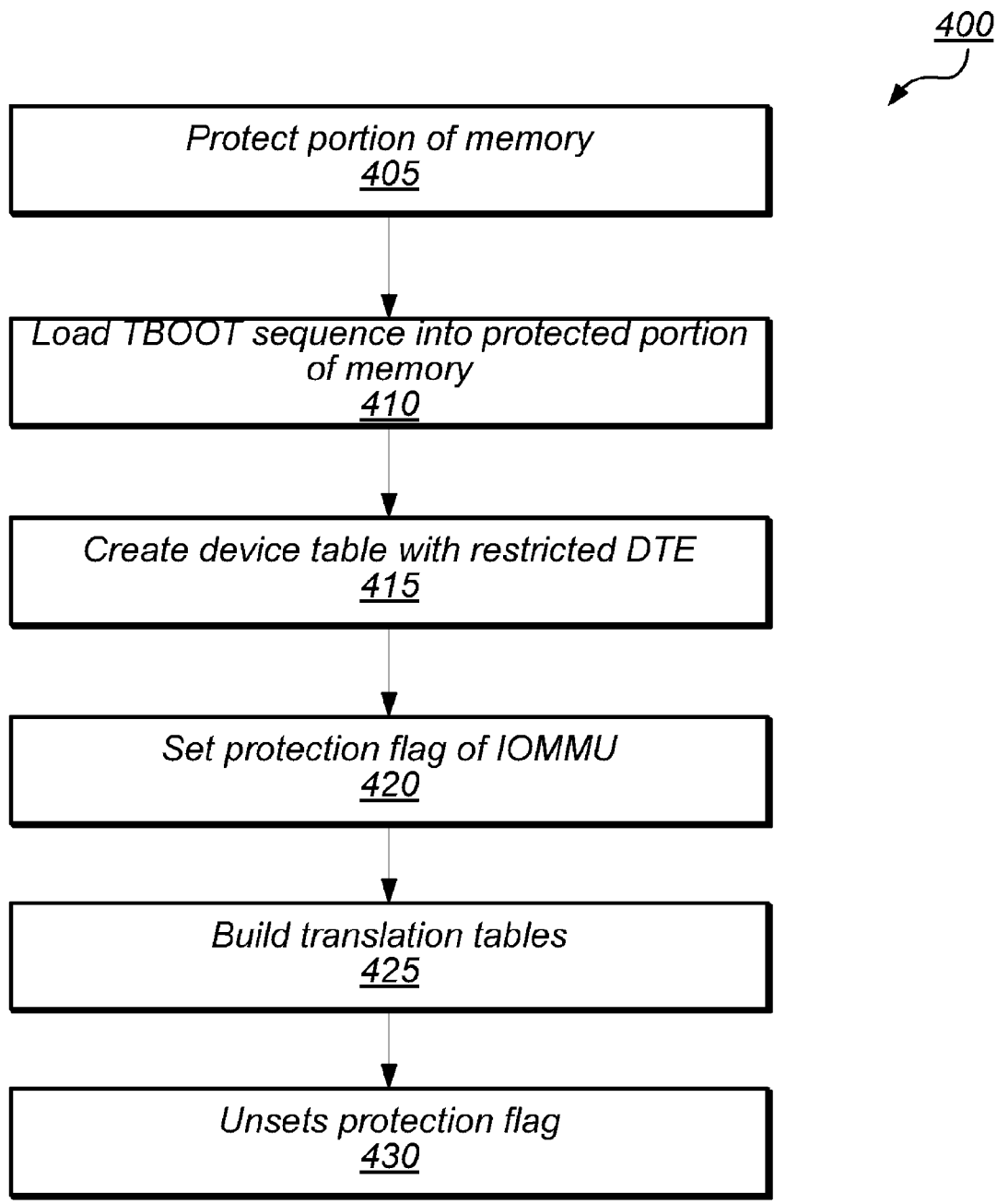
FIG. 4 is a flow diagram illustrating a method for starting a trusted boot procedure using an IOMMU capable of implementing a protection mode, as described herein, according to some embodiments.

FIG. 4 is a flow diagram illustrating a method for starting a trusted boot procedure using an IOMMU capable of implementing a protection mode, as described herein, according to some embodiments. In various embodiments, method 400 may be performed by software, such as by an operating system, a guest operating system, a virtual machine, a TBOOT sequence, and/or other software.

Method 400 begins by protecting a portion of memory, as in 405. For example, the software may protect a portion of memory may by executing a special-purpose instruction, such as an SKINIT instruction that is configured to protect 64K of memory, as described above.

In 410, the software loads a TBOOT sequence into the portion of memory protected in 405. In 415, the TBOOT sequence creates a device table in the protected portion of memory (such as 225) and includes a restricted DTE in the device table. The restricted DTE may be the only DTE in the device table and may include one or more flags, fields, and/or pointers that prevent a device that maps to the DTE from performing DMA access.

In 420, the software sets the protection flag of the IOMMU. The protection flag may correspond to protection flag 210 of system 200. Setting the protection flag may instruct the IOMMU to begin executing in protection mode. While executing in protection mode, the IOMMU may assume a default device identifier for every memory access request the IOMMU receives regardless of which device actually sent the request. In some embodiments, the default device identifier may correspond to the restricted DTE created in 415. In such embodiments, since the restricted DTE is configured to prevent memory access by peripheral devices that map to the restricted DTE, and the IOMMU executing in protection mode maps every device to the restricted DTE, no device may perform DMA operations while the IOMMU is in protected mode.

In 425, software, such as the TBOOT sequence or other software loaded by the TBOOT sequence, may build additional translation tables that are configured to regulate DMA access by various peripheral devices. For example, in 425, software may create additional DTEs in the device table. Each additional DTE may correspond to a respective peripheral device and include pointers to one or more translation tables configured to translate addresses of DMA operations from the respective device. The translation tables built in 425 may include restrictions that disable corresponding peripheral devices from accessing various trusted portions of memory.

Once the software has built translation tables configured to control DMA memory access from peripherals, as in 425, the software may unset the protection flag, as in 430. Once the protection flag is unset, the IOMMU may return to executing in a non-protected mode. When executing in the non-protected mode, the IOMMU may handle incoming memory access requests by determining the device identifier with which the request is tagged (i.e., the identifier of the requesting device), locating one or more translation tables corresponding to the device identifier (e.g., of those built in 425), and using the located tables to translate the one or more memory addresses specified in the memory access request.

Figure 5:
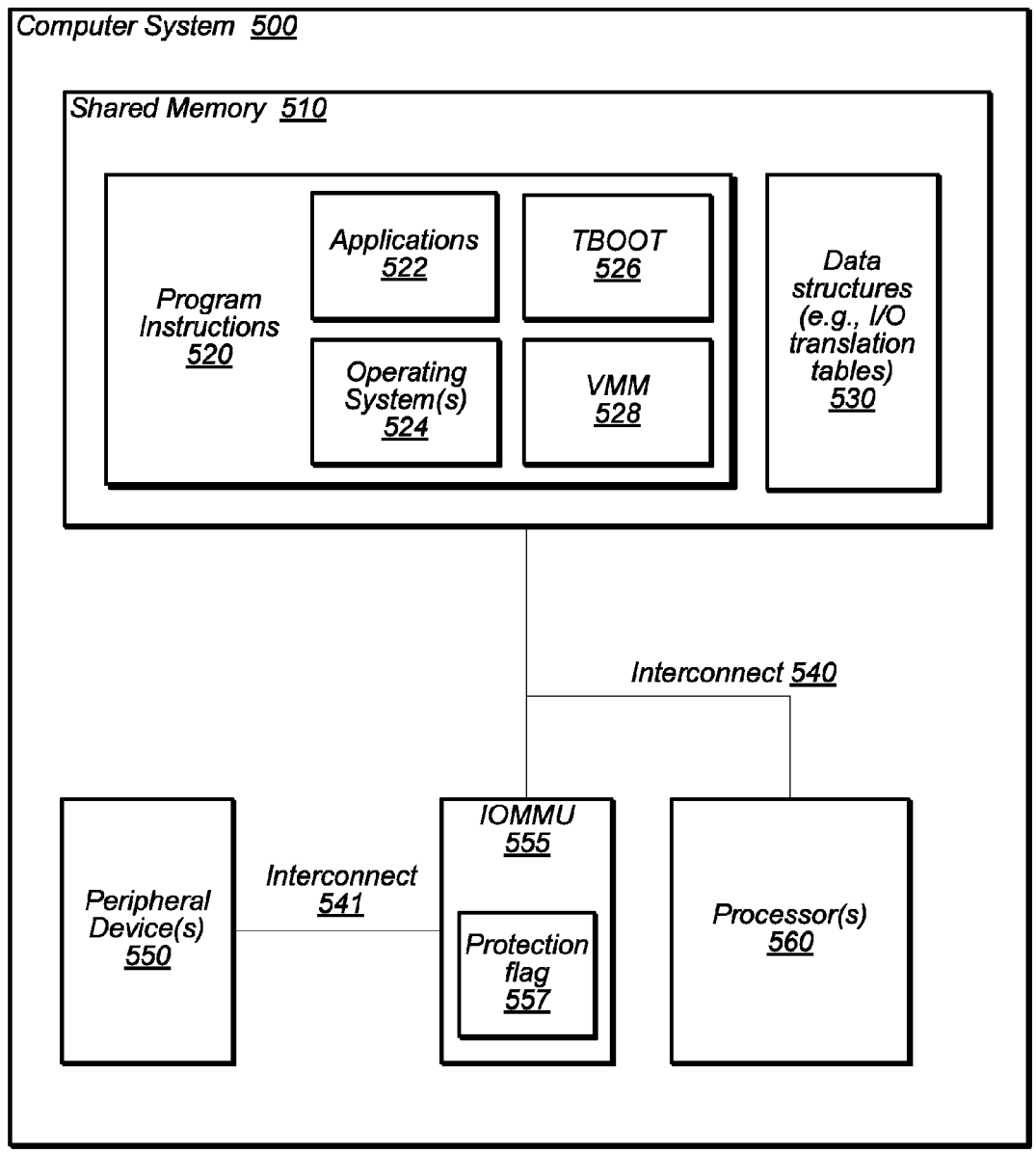
FIG. 5 is a block diagram illustrating a computer system configured to perform memory access parameter injection as described herein, according to some embodiments.

FIG. 5 is a block diagram illustrating a computer system configured to perform memory access parameter injection as described herein, according to some embodiments. The computer system 500 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 500 may include one or more processors 560, any of which may include multiple physical and/or logical cores. Any of processors 560 may correspond to processor 12 of FIG. 1 and may be executing VMMs and/or multiple guest operating systems. Computer system 500 may also include one or more peripheral devices 550, which may correspond to I/O devices 22 of FIG. 1, and an IOMMU device 555, as described herein, which may correspond to IOMMU 26 of FIG. 1.

According to the illustrated embodiment, computer system 500 includes one or more shared memories 510 (e.g., one or more of cache, SRAM, DRAM, stacked memory, RDRAM, EDO RAM, DDR 5 RAM, SDRAM, Rambus RAM, EEPROM, etc.), which may be shared between multiple processing cores, such as on one or more of processors 560. In some embodiments, different ones of processors 560 may be configured to access shared memory 510 with different latencies and/or bandwidth characteristics. Some or all of memory 510 may correspond to memory 20 of FIG. 1.

The one or more processors 560, the peripheral device(s) 550, and shared memory 510 may be coupled via interconnect 540 and interconnect 541. In various embodiments, the system may include fewer or additional components not illustrated in FIG. 5. Additionally, different components illustrated in FIG. 5 may be combined or separated further into additional components.

In some embodiments, shared memory 510 may store program instructions 520, which may be encoded in platform native binary, any interpreted language such as Java™ bytecode, or in any other language such as C/C++, Java™, etc. or in any combination thereof. Program instructions 520 include program instructions to implement software, such as a VMM 528, any number of virtual machines, a TBOOT sequence 526, any number of operating systems 524 (guest or conventional), and any number of applications 522 (guest or conventional) configured to execute on the OSs 524. Any of software 522-528 may be single or multi-threaded. In various embodiments, OS 524 and/or VMM 528 may set protection flag 557 in IOMMU 555 to put the IOMMU 555 into a protection mode of execution, as described herein.

According to the illustrated embodiment, shared memory 510 includes data structures 530, which may be accessed by ones of processors 560 and/or by ones of peripheral devices 550 via IOMMU 555. Data structures 530 may include various I/O translation tables, such as 325 in FIG. 3 and 36 in FIG. 1. Ones of processors 560 may cache various components of shared memory 510 in local caches and coordinate the data in these caches by exchanging messages according to a cache coherence protocol.

Program instructions 520, such as those used to implement software 522-528 may be stored on a computer-readable storage medium. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions.

A computer-readable storage medium as described above may be used in some embodiments to store instructions read by a program and used, directly or indirectly, to fabricate hardware comprising one or more of processors 550. For example, the instructions may describe one or more data structures describing a behavioral-level or register-transfer level (RTL) description of the hardware functionality in a high level design language (HDL) such as Verilog or VHDL. The description may be read by a synthesis tool, which may synthesize the description to produce a netlist.

The netlist may comprise a set of gates (e.g., defined in a synthesis library), which represent the functionality of processor 500. The netlist may then be placed and routed to produce a data set describing geometric shapes to be applied to masks. The masks may then be used in various semiconductor fabrication steps to produce a semiconductor circuit or circuits corresponding to processors 50 and/or 550. Alternatively, the database may be the netlist (with or without the synthesis library) or the data set, as desired.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed:

1. An apparatus comprising:
   a memory management unit configured to receive memory access requests from a plurality of I/O devices and to implement a protection mode;
   wherein, while executing in the protection mode, the memory management unit is configured to prevent memory accesses by the plurality of I/O devices by mapping each of the memory access requests to the same set of memory address translation data; and
   wherein, while not executing in the protection mode, the memory management unit is configured to permit memory access requests from the plurality of I/O devices by mapping different memory access requests to different respective sets of memory address translation data.

2. The apparatus of claim 1, wherein at least some of the memory address translation data is stored in memory using one or more memory address translation tables or in a hardware register.

3. The apparatus of claim 1, wherein the memory management unit is configurable to enter the protection mode in response to software setting a protection flag of the memory management unit.

4. The apparatus of claim 1, wherein mapping the memory access requests to the same set of memory address translation data comprises: tagging the memory access requests with a default device identifier value.

5. The apparatus of claim 4, wherein the default device identifier value corresponds to a restricted entry in a device table, wherein the restricted entry indicates that the device is not permitted to access system memory.

6. The apparatus of claim 4, wherein the default device identifier value corresponds to a restricted entry in a device table, wherein the restricted entry indicates that the IOMMU should translate memory access requests from the device using address translation data that maps all memory addresses to the same restricted portion of system memory.

7. The apparatus of claim 6, wherein the restricted portion of system memory is zero-sized.

8. The apparatus of claim 6, wherein the restricted portion of memory is outside of a portion used to implement a trusted boot procedure.

9. The apparatus of claim 1, wherein the memory management unit is configured to prevent the memory accesses by returning an error code in response to receiving a memory access request from one of the I/O devices.

10. A computer-implemented method of protecting memory using a memory management unit in a processing system, the executing comprising:
    the memory management unit, while executing in a protection mode:
      receiving requests for memory access from I/O devices;
      in response to receiving the requests, the memory management unit preventing the requested memory accesses by mapping each of the requests to the same set of memory address translation data;
    the memory management unit, while executing in an unprotected mode:
      receiving other requests for memory access from two or more of the I/O devices;
      determining a respective set of memory address translation data for each of the two or more of the I/O devices; and
      for each of the other requests, mapping the request to the set of memory address translation data corresponding to the I/O device that made the other request.

11. The method of claim 10, wherein at least some of the memory address translation data is stored in memory using one or more memory address translation tables or is stored in a hardware register.

12. The method of claim 10, further comprising: the memory management unit entering the protection mode in response to software setting a protection flag of the memory management unit.

13. The method of claim 10, wherein mapping the memory access requests to the same set of memory address translation data comprises: tagging the memory access requests with a default device identifier value.

14. The method of claim 13, wherein the default device identifier value corresponds to a restricted entry in a device table, wherein the restricted entry indicates that the device is not permitted to access system memory.

15. The method of claim 13, wherein the default device identifier value corresponds to a restricted entry in a device table, wherein the restricted entry indicates that the IOMMU should translate memory access requests from the device using address translation data that maps all memory addresses to the same restricted portion of system memory.

16. The method of claim 15, wherein the restricted portion of system memory is zero-sized.

17. The method of claim 15, wherein the restricted portion of memory is outside of a portion used to implement a trusted boot procedure.

18. A non-transitory computer readable storage medium comprising a data structure which is operated upon by a program executable on a computer system, the program operating on the data structure to perform a portion of a process to fabricate an integrated circuit including circuitry described by the data structure, the circuitry described in the data structure including:
   a memory management unit configured to receive memory access requests from a plurality of I/O devices and to implement a protection mode;
   wherein, while executing in the protection mode, the memory management unit is configured to prevent memory accesses by the plurality of I/O devices by mapping each of the memory access requests to the same set of memory address translation data; and
   wherein, while not executing in the protection mode, the memory management unit is configured to permit memory access requests from the plurality of I/O devices by mapping different memory access requests to different respective sets of memory address translation data.

19. The computer readable medium of claim 18, wherein at least some of the memory address translation data is stored in memory using one or more memory address translation tables or in a hardware register.

20. The computer readable storage medium of 18, wherein the storage medium stores HDL, Verilog, or GDSII data.

21. The computer readable storage medium of claim 18, wherein mapping the memory access requests to the same set of memory address translation data comprises: tagging the memory access requests with a default device identifier value.

22. A non-transitory, computer-readable storage medium storing program instructions executable by a computer system to implement a trusted initialization procedure, wherein the procedure comprises:
   configuring a memory management unit to execute in a protection mode, wherein, while in the protection mode, the memory management unit prevents memory accesses by a plurality of I/O devices by mapping memory access requests from the plurality of I/O devices to the same set of memory address translation data, wherein when not in the protection mode, the memory management unit is configured to map I/O requests from the plurality of I/O devices to different respective sets of memory address translation data.

23. The storage medium of claim 22, wherein at least some of the memory address translation data is stored using one or more address translation tables or in a hardware register.

24. The storage medium of claim 22, wherein the trusted initialization procedure further comprises:
   executing a secure kernel initialization instruction to protect a portion of system memory from direct memory access by one or more peripheral devices; and
   creating the set of one or more address translation tables within the protected portion of memory.

25. The storage medium of claim 22, wherein the program instructions executable to implement the trusted initialization procedure are part of an operating system, a guest operating system, or a virtual machine monitor.

26. The storage medium of claim 22, wherein configuring the memory management unit to execute in a protection mode comprises setting a protection flag of the memory management unit.

27. A computer-implemented method of implementing a trusted initialization procedure, the method comprising:
   executing a secure kernel initialization instruction to protect a portion of system memory from direct memory access by a plurality of I/O devices;
   creating a set of one or more address translation tables within the protected portion of memory, wherein the set of one or more memory address translation tables prevent memory access; and
   configuring a memory management unit to execute in a protection mode, wherein, while in the protection mode, the memory management unit prevents memory accesses by the plurality of I/O devices by mapping memory access requests from the plurality of I/O devices to the set of one or more memory address translation tables that prevent memory access, wherein when not in the protection mode, the memory management unit is configured to map I/O requests from the plurality of I/O devices to different respective sets of one or more memory address translation tables.

28. The method of claim 27, wherein mapping the memory access requests to the same set of memory address translation data comprises: tagging the memory access requests with a default device identifier value corresponding to a restricted entry in a device table, wherein the restricted entry indicates that the device is not permitted to access system memory.

29. The method of claim 27, wherein mapping the memory access requests to the same set of memory address translation data comprises: tagging the memory access requests with a default device identifier value corresponding to a restricted entry in a device table, wherein the restricted entry indicates that the IOMMU should translate memory access requests from the device using address translation data that maps all memory addresses to the same restricted portion of system memory.

30. The method of claim 29, wherein the restricted portion of system memory is zero-sized.

31. The method of claim 29, wherein the restricted portion of memory is outside of a portion used to implement a trusted boot procedure.

32. The computer-implemented method of claim 27, wherein the program instructions executable to implement the trusted initialization procedure are part of an operating system, a guest operating system, or a virtual machine monitor.

33. The storage medium of claim 27, wherein configuring the memory management unit to execute in a protection mode comprises setting a protection flag of the memory management unit.

* * * * *